Sept. 22, 1959
H. E. JACKSON
2,905,090
DOUBLE-ACTING FLUID METERING-EJECTOR
Filed March 7, 1957
3 Sheets-Sheet 1
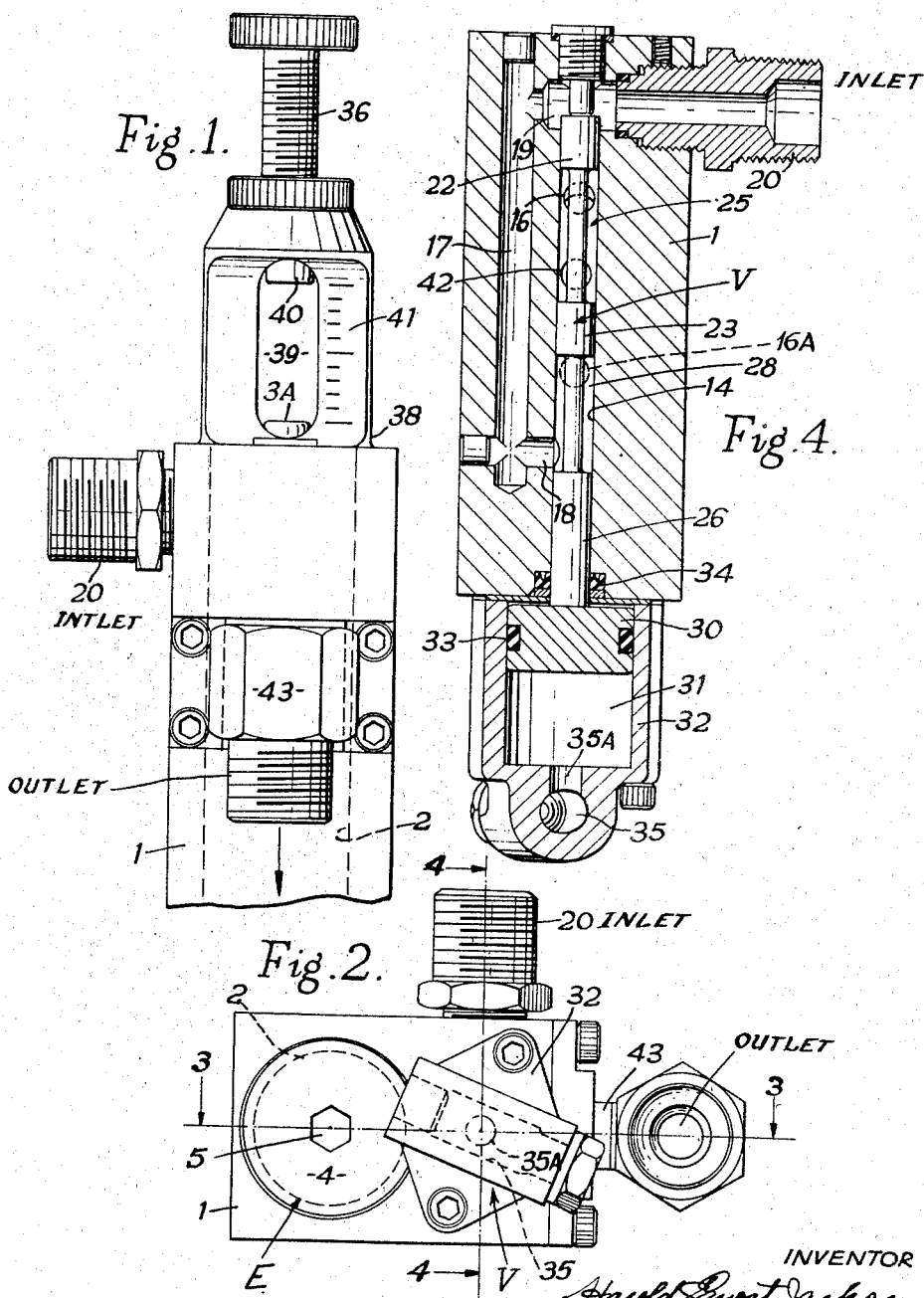

Sept. 22, 1959
H. E. JACKSON
2,905,090
DOUBLE-ACTING FLUID METERING-EJECTOR
Filed March 7, 1957
3 Sheets-Sheet 2

INVENTOR
Harold Ernest Jackson
BY
ATTORNEY

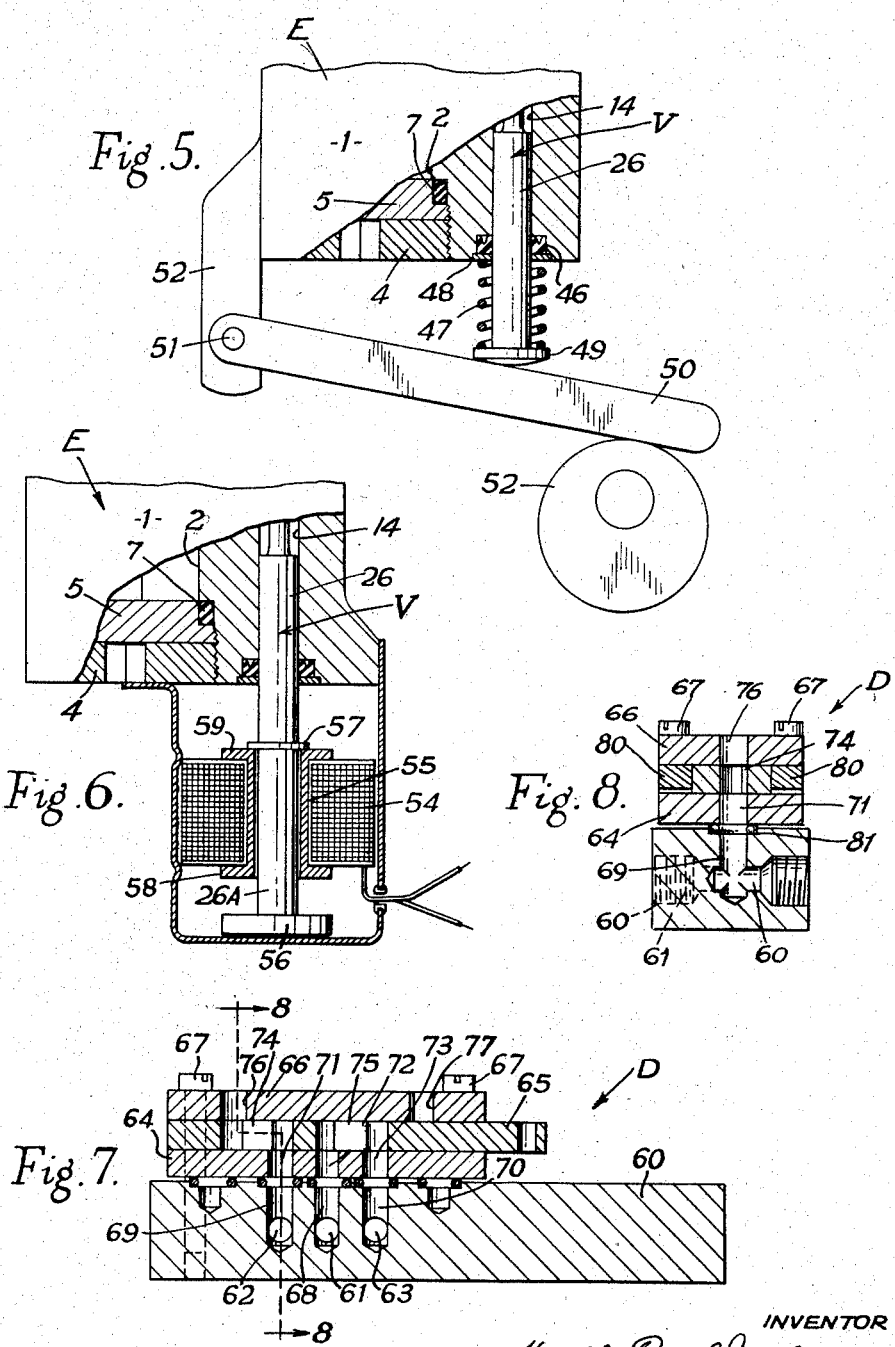

United States Patent Office 2,905,090
Patented Sept. 22, 1959

2,905,090

DOUBLE-ACTING FLUID METERING-EJECTOR

Harold Ernest Jackson, Plympton St. Maurice, England, assignor to Tecalemit Limited, Brentford, England Application March 7, 1957, Serial No. 644,514

Claims priority, application Great Britain March 9, 1956

7 Claims. (Cl. 103—52)

The present invention relates to double-acting metering-ejector for fluids and, more particularly, but not exclusively, to such ejectors intended for the dispensation of liquids through supply conduits exposed to the weather, when these conditions, or the viscosity of the liquid concerned, requires a positive action of the ejector.

A principal object of the invention is to provide a double-acting metering-ejector which is not dependent upon spring action for its operation and the action of which is aided by compressed air, the supply of this air being cyclically controlled or by cyclically-controlled mechanical or electrical means.

Since ejection of the fluid is carried out on each succeeding stroke of a delivery or metering piston, instead of on each cycle, the ejector is not constantly compressing and venting and thus is more likely to be free from leaks, while a constant pressure of fluid can be maintained on the inlet side of the ejector.

The present invention provides a double-acting metering-ejector device which acts to force a fluid (hereinafter called "oil" in order to distinguish it from other fluids that may be employed with the device) to a place of use of the oil and which comprises a delivery or metering cylinder, a delivery or metering piston reciprocably arranged in the cylinder and which on each of its strokes acts to force oil from the cylinder space on one side of the piston through an outlet to a place of use of the oil and simultaneously allows oil to enter the cylinder space on the opposite side of the piston, and valve means which controls the flow of oil into the delivery or metering cylinder alternately, first to the cylinder space on one side of the piston and, then, to the cylinder space on the opposite side of the piston; and the flow of oil out of the cylinder alternately first from the cylinder space on the one side of the piston and, then, from the cylinder space on the opposite side of the piston, the said valve means also acting to connect the cylinder spaces on opposite sides of the piston alternately to the said outlet. The action of the said valve means may be controlled in part by fluid pressure other than the said oil to be ejected to a place of use of the oil. Alternatively, the valve means may be controlled by mechanical or electrically-operated means actuated in a predetermined time-sequence.

The said valve means may consist of a fluid-actuated slide valve which is reciprocable in a cylinder connected by passages to the oil inlet, to the metering cylinder on opposite sides of the piston therein and to the said oil outlet. The passage connected to the oil outlet is in constant communication with the valve cylinder, the arrangement being such that no matter on which stroke the delivery or metering piston is moving the cylinder space on one side of the piston is always connected to the outlet. The opening and closing of the passages connecting the valve cylinder to the delivery or metering cylinder are controlled by the movements of the valve.

In one constructional form of the invention, the slide valve is moved in one direction by a compressed air-operated piston and in the other direction by the pressure of the oil which is fed into the delivery or metering cylinder, time-controlled means being provided whereby the air is fed into the cylinder, in which the piston is slidable, to cause the piston to carry out a stroke in one direction and then exhausted from the cylinder so that the piston may carry out its return stroke under the action of the oil upon the slide valve.

In the same construction, the slide valve is formed with three spaced valve parts connected by reduced parts, so that two separated annular spaces are formed in the valve cylinder. Thus, when the slide valve has moved into one operative position, the cylinder space on one side of the metering piston communicates with one of the said annular spaces and with the oil outlet while, when the valve has moved into its other operative position, the cylinder space on the opposite side of the piston communicates with the other annular space.

It will be understood that the slide valve could be operated by a piston actuated by pressure-fluid other than compressed air.

Constructional forms of the invention, each applied to a double-acting oil metering-ejector, are shown, by way of example, in the accompanying drawings, wherein:

Fig. 1 is an outside elevation of a metering-ejector in which the slide valve is operated in part by compressed air;

Fig. 2 is an underneath plan view of the ejector;

Fig. 4 is a section on the line 4—4 in Fig. 2;

Fig. 5 is a fragmentary view, partly in section of a modification in which the slide valve is actuated by mechanical means;

Fig. 6 is a fragmentary view, partly in section, of another modification in which the slide valve is actuated by electrically-operated means;

Fig. 7 is a longitudinal sectional view of a distributor used in connection with the air cylinder of the ejector; and Fig. 8 is a transverse sectional view of the distributor and is taken substantially on line 8—8 of Figure 7.

Figure 3:
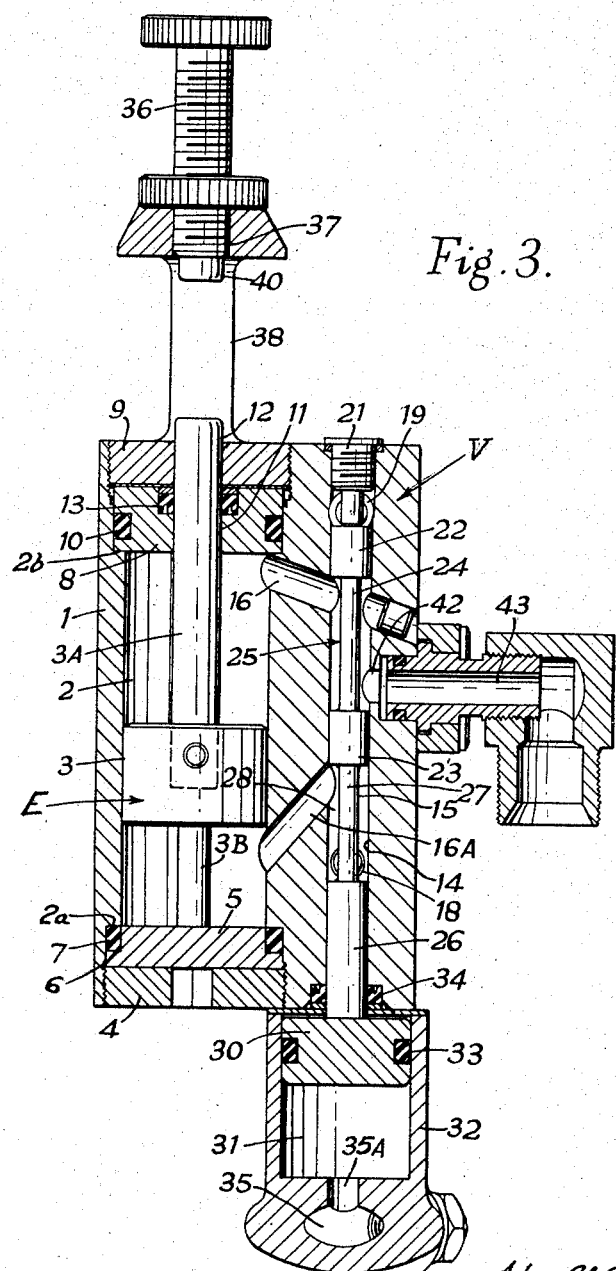
Fig. 3 is a section on the line 3—3 in Fig. 2.

Referring first to Figs. 1 to 4:

The metering-ejector E comprises a body 1 which is provided with a cylinder bore 2 of relatively large diameter which forms an oil delivery or metering cylinder in which a delivery or metering piston or septum 3 is slidable (see Fig. 3). The lower end of the metering cylinder 2 is closed by a plug 4 and between the upper face of the plug and a shoulder 2a, formed at the lower end of the cylinder bore, there is a disc 5 formed with a peripheral annular recess 6 to acommodate an O-sealing ring 7, which is also fitted in said annular recess 6, to abut the shoulder 2a in the lower part of the metering cylinder when the parts are assembled as shown in Fig. 3.

The upper end of the metering cylinder 2 is closed by a gland disc 8, which is held in position against a shoulder 2b in the cylinder 2, by means of a threaded plug 9 screwed into the threaded upper end of the cylinder. The gland disc is provided with a circumferential O-sealing ring 10 which is arranged in an annular peripheral groove in the gland disc and engages the wall of the cylinder. The gland disc 8 is formed centrally with a hole 11 which acts as a guide for a piston rod 3A projecting upwards from the metering piston and passing through the hole 11 and, also, through a coaxial guide hole 12 formed in the threaded plug 9. The upper end of the hole 11 in the gland disc 8 is counter-bored to receive a U-sealing packing 13 which prevents leakage of liquid along the piston rod 3A and to the exterior of the body 1 through the guide hole 12 in the threaded plug.

The oil, or other fluid, to be ejected in measured amounts, is delivered, from the inlet 20 through a control valve means V to the cylinder 2. The valve means V is disposed preferably in the body 1 which is formed with a cylindrical bore 14 of small diameter which is parallel to, and spaced laterally from, the metering cylinder 2 (see Figs. 3 and 4), and which acts as a cylinder for a slide valve 15, which latter will be more fully described hereinafter. The upper end of the valve cylinder 14 is closed by a threaded plug 21, which acts as a stop for the slide valve 15. The slide valve cylinder 14 communicates near the upper end (as shown in the drawing) with the upper end of the metering cylinder 2 below the gland disc 8 by means of an upper inclined cross passage 16 which passes through the part of the body 1 between the two cylinders so as to deliver oil to one (or the upper) side of the metering piston 3. It will be observed that the valve cylinder 14 is provided with an outlet port 42 positioned about midway between the cross-passages 16 and 16A, this port 42 communicating with a union 43 which is coupled to a conduit (not shown) for delivering the metered and ejected charges of oil (or other fluid) to a place of use. Furthermore, the valve cylinder 14 communicates with the metering cylinder 2 at a point between the metering-piston 3 (when the piston is in its lowermost position as shown in Fig. 3) and the end disc 5, roughly at about the center of its length, by means of a lower declined cross passage 16A passing through the part of the body 1 separating the two cylinders so as to deliver oil to the other (or lower) side of the metering-piston 3.

Associated with the valve cylinder 14 is a transfer or by-pass passage 17, preferably formed in the body 1 and parallel with said valve cylinder 14, in order to deliver the fluid or oil (to be metered and ejected) to the lower end of valve cylinder 14 as shown in Fig. 4. The upper end of this transfer passage 17 (i.e. with reference to its position as shown in the drawings) communicates with the upper end of the valve passage 14 by means of a lateral passage 19 which extends from the transfer passage 17 across the top of and through the valve cylinder 14 intersecting it and terminating at the side of the body 1 in a countersunk and screw-threaded opening into which the oil inlet 20 is coupled, the union 20 being connected to a source of supply (not shown) of oil under pressure. Also, this transfer passage 17 is in communication with the valve cylinder 14 at a point below the lower cross-passage 16A through a lateral port 18.

The slide valve 15 is formed with an upper cylindrical valve part 22 and with an intermediate cylindrical valve part 23, the two valve parts being connected by an elongated portion 24 of reduced diameter which thus provides an upper annular space 25 in the slide valve cylinder between the two valve parts 22 and 23. The intermediate valve part 23 is spaced from a longer cylindrical valve part 26, at the lower end of the slide valve, and the two parts 23 and 26 are connected by an elongated portion 27 of reduced diameter which thus provides an annular passage 28 in the slide valve cylinder between the two valve parts 23 and 26. The purpose of spacing the three valve parts 22, 23 and 26 will appear hereinafter, but it will be observed here that the end valve part 22 and the intermediate valve part 23 are positioned relative to each other and to the cross-passages 16 and 16A and to the ports 18 and 42 so that when these parts are in one of their extreme positions of movement, as shown in Figs. 3 and 4, the cross-passage 16 is in communication with the outlet port 42 and the cross-passage 16A is cut off from communication with the outlet port 42 but in communication with supply port 18; and, when these parts are in the other of their extreme positions of movement, the valve part 22 moves across the cross-passage 16 and cuts off its communication with the outlet port 42 and opens it to the supply port 19 and the valve part 23 moves past the cross-passage 16A to a position between the cross-passage 16A and the supply port 18, thus putting the cross-passage 16A in communication with the outlet port 42 and cuts off communcation between the cross-passage 16A and the supply port 18.

The lower valve part 26 of the slide valve projects out of the lower end of the valve cylinder and it is connected to, or is integral with, an air-operated piston 30 slidable in an air cylinder 31 formed in a cup-fitting 32 which is attached to the lower end of the body, the air cylinder being coaxial with the valve cylinder 14. The air-operated piston 30 is provided with a sealing ring 33 which is fitted in an annular recess in the piston and which cooperates with the wall of the air cylinder 31 to prevent leakage of air between the cylinder and the piston. A U-packing 34 is provided in the body around the lower valve part 26 of the slide valve to prevent leakage of air from the air cylinder along the valve part. The cup-fitting 32 is formed with an air inlet and venting passage 35 which communicates by means of a port 35A with the interior of the air cylinder 31 and with an air vent adjacent to its upper edge.

The metering piston 3 is provided with a downwardly projecting piston rod 3B which, when the piston is in its lower position in its cylinder, engages with the upper surface of the O-ring disc 5, which surface thus forms an abutment to prevent further downward movement of the piston. On the completion of the upward stroke of the metering piston, the end of the metering piston rod 3A, which projects through the plug 9 threaded into the upper end of the metering cylinder, is adapted to engage with a headed adjustable stop 36 in the form of a screw threaded through a hole 37 formed in the top of an upstanding pillar 38 which is integral with the threaded plug. Two vertical diametrically-opposite, elongated openings 39 (Fig. 1), are formed in the pillar 38 so that both the tip 40 of the adjusting screw and the projecting end of the piston rod 3A of the metering piston 3 can be observed through the slots. The parts of the pillar adjacent to the slots are provided with graduations 41 to facilitate the setting of the adjusting screw 36 in order to vary the length of the up-stroke of the metering piston and, therefore, the pumping capacity of the metering cylinder and piston assembly.

In order to describe the operation of the metering ejector, it will be assumed that the cylinder 2 and the various passages are filled with oil. It will also be assumed that compressed air is being supplied to the air cylinder 31 through the air inlet and venting passage 35 and port 35A leading to the cylinder 31; and, therefore, that the air-operated piston 30 is at the top of its stroke (as shown in Figs. 3 and 4), thus holding the slide valve 15 in its upper position with the upper valve part 22 disposed above the upper cross passage 16 and the intermediate valve part 23 above the lower cross passage 16A. It will also be assumed that the metering piston 3 is at the bottom of its stroke with its stop 3B engaging with the abutment formed by the O-ring disc 5 closing the lower end of the metering cylinder 2.

Assuming also that in these positions of the metering piston and the slide valve, oil under pressure is fed from the inlet 20 and passage 19 to the upper part of the slide valve cylinder 14 above the upper valve part 22 of the slide valve (see Figs. 3 and 4). Some of the oil passes through the passage 19, connected to the oil inlet 20 and into the vertical transfer passage 17 and, as the slide valve is then in its upper position, some of the oil from the vertical transfer passage 17 enters the slide valve cylinder 14 between the intermediate and lower valve parts 23 and 26 of the valve through the port 18. Hence, the oil flows from the space 28 (between valve parts 23 and 26) through the lower cross passage 16A and into the metering cylinder 2 below the metering piston 3. Due to the fact that the cross-passage 16 is in communication with the outlet port 42 and due to the action upon the piston 3 of the pressure of the oil being admitted into the cylinder through the cross-passage 16A, the metering piston 3 is thus forced upwards and it acts to discharge a measured quantity of oil from above it through the upper cross passage 16, which is then in communication with upper end of the metering cylinder and the annular space 25 in the slide valve cylinder between the upper and intermediate valve parts 22 and 23 of the slide valve. From the annular space 25 the only possible path for oil is through an outlet passage 42 formed in the body and into an outlet union 43 which is connected to a place of use of the oil.

Assuming now that the compressed air supplied to the air cylinder 31 is cut off and that oil is still entering the body from the connection 20 above the upper end of the slide valve cylinder 14 through the oil inlet passage 19, the pressure of the oil in the passage 19 and acting upon the valve part 22 forces the slide valve downwards, whereupon the upper valve part 22 of the slide valve moves below the upper cross passage 16 connecting the slide valve cylinder 14 to the metering cylinder 2, while the intermediate valve part 23 of the slide valve then moves below the lower cross passage 16A, thus connecting the slide valve cylinder with the space in the metering cylinder 2 below the metering piston 3. With this setting of the slide valve V, oil entering the upper end of the valve cylinder flows into the upper end of the metering cylinder 2 above the metering piston 3 but no oil can enter the slide valve cylinder 14 through the port 18 as the valve part 23 closes the latter. In these circumstances, the metering piston 3 is forced downwards and, during its downward movement, it forces oil through the lower cross passage 16A, which connects the metering cylinder to the slide valve cylinder, into the annular space 25 formed in the slide valve cylinder between the upper and intermediate valve parts 22 and 23 of the slide valve and thence into the oil outlet passage 42 and the oil outlet union 43. Oil cannot flow from the vertical transfer passage 17 into the metering cylinder 2 since the intermediate valve part 23 is then below the lower cross passage 16A. Thus, during each stroke of the metering piston, a quantity of oil is discharged from the metering cylinder into the oil outlet to the place of use of the oil.

A conduit (not shown) for supplying compressed air to the air cylinder 31 is connected to the air inlet to that cylinder 31 and it leads from a distributor valve D (Figs. 7 and 8) which acts to provide an alternating air supply from the source of compressed air. The distributor valve D is associated with an electrically or mechanically-operated timing device of known construction.

As mentioned above, the ejector slide valve V could be cyclically-controlled mechanically or electrically, such as by a solenoid device, instead of by pressure fluid.

Thus, referring to Fig. 5 it will be seen that the air-operated piston 30 and the cup fitting 32 are eliminated and that the lower part 26 of the slide valve is extended and projects out of the body 1 through a seal 45 fitted in a recess 46 formed in the lower face of the body. A helical spring 47 is fitted around the lower part 26 of the slide valve and reacts between a washer 48 arranged in an enlargment of the recess 46 and a head 49 on the part 26. The spring 47 tends constantly to thrust the part 26 downwards so that its head engages with an arm 50 which is pivoted at 51 to a lug 52 projecting downwards from the body 1. Thus, the arm is held in contact with a timing cam 53 which is in constant rotation.

In the modified construction shown in Fig. 6, the part 26 of the slide valve V is extended and projects out of the body 1 but in this construction the lower portion 26A of the extended portion of the part 26 forms the core of a solenoid comprising a coil 54, in the former 55 of which the portion 26A is slidable. The coil is connected to an electrical supply source through a control switch which is not shown in the figure. The upward and downward movements of the part 26 of the slide valve V is limited by flanges 56 and 57 on the part 26 which co- operate respectively with lower and upper flanges 58 and 59 on the former 55.

The distributor D referred to above could, for example, be constructed as shown is Figs. 7 and 8.

This valve assembly D comprises a rectangular metal base 60, on one side of which there is a transverse fluid supply passage 61 which extends to about the centre of the base and is fitted externally with a union whereby it may be connected to a pressure fluid supply line. On the opposite side of the base, there are two transverse service fluid passages 62 and 63 which are spaced longitudinally at equal distance from the axis of the supply passage 61 and terminate at about the centre of the base and which are respectively connected to unions connected to fluid outlet or service lines.

A rectangular metal thrust plate 64, having a lapped upper face, is arranged upon the base 60; and a rectangular metal slide bar 65 (which constitutes a slide plate valve and which has lapped upper and lower faces) is slidably mounted upon the upper face of the thrust plate 64. The width of the slide valve plate 65 is less than the width of the thrust plate 64 (see Fig. 8) and on opposite sides of the slide valve there are metal wall members 80 which are mounted upon the thrust plate. In the vertical plane the wall members 80 serve as spacer or distance pieces and in the horizontal plane as guides for the slide valve plate 65.

A rectangular metal head plate 66, which has a flat lapped under face, is mounted upon the upper faces of the said wall members 80 and slide valve 65, the width of the head plate being the same, or substantially the same, as that of the thrust plate 64, and thus of the combined width of the two wall members and the slide valve. The assembly of the base 60, the thrust plate 64, the slide valve 65, the wall members 80 and the head plate 66 is held against vertical separation by four holding screws 67 which pass through holes at the corners of the head plate, through holes in the wall members 80 and through sleeves which are arranged between the upper face of the base 60 and the under faces of the two wall members 80, the thrust plate being recessed at its corners and the sleeves being fitted in the recesses.

The right hand end of the slide valve 65 projects from between the ends of the head plate 66 and thrust plate 64 and it is connected to an electrically or mechanically-operated timing device (not shown) which may be of known construction. The construction, therefore, is such that the reciprocate valve 65 can be made to slide within the guides formed between the said wall members 80 and between the lapped upper face of the thrust plate 64 and the lapped under face of the head plate 66.

The above mentioned fluid supply passage 61 in the base is connected to a central vertical port 68 in the base and the two other fluid outlet passages 62 and 63 in the base are respectively connected to vertical ports 69 and 70 formed in the base plate and spaced at equal distances on the opposite sides of the central port 68.

The thrust plate 64 is formed with three longitudinally spaced vertical ports 71, 72 and 73 which are coaxial with the three above mentioned vertical ports 69, 68 and 70 in the base. The slide valve plate 65 is formed with two longitudinally-spaced elongated ports 74 and 75 which respectively are of a length to overlie and communicate any two adjacent ports 71, 72 or 73. The ports 74 and 75 are formed with two rounded ends, which are roughly of the same diameter as the ports in the thrust plate 64 and connected by straight portions, the widths of which straight portions may be less than the diameters of the two curved end portions of the ports. The construction is such that, when, as shown in Fig. 7, the slide valve 65 is in one operative position in which the left hand end of the right hand port 75 in the slide valve plate 65 is in communication with the central supply port 72 in the thrust plate 64, the right hand end of the same port 75 in the slide valve is in communication with the right hand port 73 in the thrust plate 64; and, at the same time the right-hand end of the other port 74 in the slide valve plate 65 is then in communication with the left-hand port 71 in the thrust plate 64 and the left-hand end of the same port 74 is in communication with an exhaust port 76 which is formed in the head plate and which is longitudinally spaced outwardly from the port 71 in the thrust plate 64, there being another exhaust port 77 formed in the head plate and longitudinally spaced outwardly from the port 73 in the thrust plate 64.

When the slide valve 65 has been moved fully to the left as shown in Fig. 7, fluid from the supply line flows through the supply passage 61 in the base upwards through the central ports 68 and 72 into the left-hand end of the right-hand port 75 in the slide valve plate 65 and through the port 75 into the right-hand port 73 in the thrust plate 64 from which latter it flows downwards into the right-hand service passage 63 and thence to the passage 35 of the valve means V of the ejector E. In this position of the slide valve plate 65 the right-hand exhaust port 77 in the head plate 66 is masked and closed by the slide valve plate 65.

Spent fluid entering the left-hand passage 62 in the base from the air cylinder 31 of the valve means V flows upwards through the left hand vertical ports 69 and 71, in the base and thrust plate respectively, and into the right-hand end of the left-hand port 74 in the slide valve plate 65, from which it passes to the exhaust port 76 in the head plate 66.

In order to reverse the direction of flow of the fluid, the slide valve plate 65 is moved into an extreme right-hand position as viewed in Fig. 7. The right-hand end of the left-hand port 74 in the slide valve then registers with the central supply passage 61 and ports 68—72 and its left-hand end registers with the service passage 62 through ports 69—71 the left-hand exhaust port 67 in the head plate 66 then being masked or closed. From the port 74 in the slide valve plate 65, the fluid then flows downwardly through the left-hand ports 71 and 69 in the thrust plate and base, respectively, and into the left-hand service passage 62. In the same position, the left-hand end of the right-hand port 75 in the slide valve plate 65 registers with the right-hand service ports 73 and 70 in the thrust plate and base respectively. The right-hand end of the right-hand port 75 in the slide valve plate 65 then registers with the right-hand exhaust port 77 in the head plate 66, with the result that fluid from the right-hand passage 63 in the base flows upwardly through the right-hand ports 70 and 73 into the port 75 from whence it passes through the exhaust port 77 in the head plate 66. The exhaust ports 76 and 77 in the head plate 66 may, when a piped exhaust port is desirable, conveniently be conducted to a single exhaust line by means of a hood secured by the holding down screws.

I claim:

1. A double-acting metering-ejector device for forcing measured quantities of a fluid to a place of use; said device comprising a closed metering cylinder having a septum movably disposed therein dividing the cylinder into two fluid measuring spaces; a valve-means including a reciprocal valve member and having passages therein one communicating with each of said measuring spaces, respectively, in said cylinder and having an outlet port all controlled by said valve member; said valve-means having an inlet port connectable to a source of fluid supply under pressure, that is to be measured and ejected, and positioned so that said valve member is moved in one direction of its movement by said fluid pressure at said inlet port to open one of said passages to one of said measuring spaces in the cylinder for the admission therein of said fluid and communicating the other of said passages with said outlet port; a by-pass passage connecting said inlet with said valve-means and having its discharge end positioned to be controlled by said valve member and to communicate with the passage to the said other of said measuring spaces in the cylinder, when said valve-member is in one of its positions, and to close said communication, when the valve-member is actuated by said fluid pressure at the inlet port; and a time-controlled means for actuating said valve-member in its other direction of movement, whereby said valve-member closes the previously opened passage to the cylinder to the admission of said fluid thereto and communicates it with said outlet port and, simultaneously, closes the communication of the said other of said passages to the cylinder with said outlet port and opens it to the admission of said fluid from said by-pass passage.

2. The subject matter of claim 1 wherein the time-controlled means includes a cylinder-and-piston actuator connected to said valve-member, the cylinder of said actuator having a combined fluid inlet and vent port connected to a source of fluid supply under pressure through a valving mechanism that alternately admits said fluid pressure to said actuator and vents said actuator, whereby, when said actuator is vented, said valve-member is actuated by the pressure of the fluid to be measured and ejected to a place of use and, when said actuator is supplied with fluid pressure, the valve-member is moved thereby in its opposite direction.

3. An ejector device as claimed in claim 1, wherein the valve member is controlled by a cam actuated in a predetermined time-sequence.

4. An ejector device as claimed in claim 1, wherein said valve means includes a cylinder having said valve member slidably fitted therein, said valve member being formed with three spaced valve parts connected by reduced portions so that two separated annular spaces are formed in the valve cylinder, the arrangement being such that when the valve member has moved into one operative position the measuring space on one side of the metering septum communicates with one of the said annular spaces and with the outlet port, while when the valve has moved into its other operative position the cylinder space on the opposite side of the septum communicates with the other annular space.

5. An ejector device as claimed in claim 1, wherein the time controlled means includes a solenoid, and wherein the valve member forms the core of the solenoid, the coil of the solenoid being connected to an electrical supply source through a control source.

6. A double-acting metering device for forcing measured quantities of fluid to a place of use; said device comprising a metering cylinder, a metering septum reciprocably mounted in the cylinder to divide the latter into two fluid measuring spaces one on each side thereof, each measuring space having a passage from said cylinder, said septum being positioned to force fluid from a measuring space on each of its strokes through the passage communicating with the said space and simultaneously allowing fluid to enter the measuring space on the opposite side of said septum; a valve means including a valve cylinder having an inlet for fluid under pressure and having ports connecting it to said passages in said metering cylinder, and further having an outlet for discharging said measured fluid; a valve member in said cylinder exposed to the fluid pressure from said inlet and movable in one direction by said fluid pressure admitted to said valve cylinder; a third cylinder having a combined fluid inlet and vent port therein connected to a source of fluid under pressure, and a fluid-actuated piston in said third cylinder connected to said valve member, whereby said valve member is actuated in one direction by the fluid pressure to be metered and in the opposite direction by said fluid-actuated piston; said valve member being formed to allow fluid to enter and fill one of said measuring spaces in said metering cylinder, when moved under the influence of the fluid pressure to be metered, to cause said septum to force the fluid from the other of said spaces in said metering cylinder through said outlet and, when moved under the influence of said fluid-actuated piston, to allow fluid to enter said other of the measuring spaces to cause said septum to force fluid from the previously filled space through said outlet.

7. A double-acting metering-ejector device for forcing measured charges of fluid to a place of use; said device comprising a metering cylinder having a movable septum therein dividing it into two fluid measuring spaces; a slide valve in a cylinder, which latter has an outlet discharge port intermediate its length, said valve cylinder being in communication with each of said measuring spaces through passages arranged on opposite sides of and spaced from said outlet port respectively; inlet means for the valve cylinder connected with a fluid supply, under pressure, to be metered and communicating with the end portions of said valve cylinder; said slide valve being formed with two spaced valve parts connected by a reduced portion and arranged respectively to lie on opposite sides of the outlet port and each to move across one of said communicating passages with the metering cylinder to alternately open and close said passages to the outlet port, one end of said slide valve being exposed to the fluid inlet pressure to move the slide valve in one direction to open communication between said inlet and one of said measuring spaces and close its communication with the outlet port and simultaneously open communication of the other measuring space with the outlet port and close communication of said last mentioned space with said inlet; and intermittently-actuated means for moving said slide valve in the other direction against said inlet pressure to close communication between the outlet port and said last mentioned measuring space and communicate it with said inlet and simultaneously close the first mentioned measuring space to the inlet and open communication between it and said outlet port.

References Cited in the file of this patent

UNITED STATES PATENTS

| | | |
|---|---|---|
| 2,442,916 | Buchanan | June 8, 1948 |
| 2,576,747 | Bryant | Nov. 27, 1951 |